United States Patent
Melzner et al.

(10) Patent No.: US 7,682,723 B2
(45) Date of Patent: Mar. 23, 2010

(54) MEMBRANES FOR FUEL CELLS, METHOD FOR PRODUCING SAID MEMBRANES AND PRODUCTION OF FUEL CELLS USING MEMBRANES OF THIS TYPE

(75) Inventors: Dieter Melzner, Goettingen (DE); Annette Reiche, Goettingen (DE); Ulrich Maehr, Berlin (DE); Suzana Kiel, Goettingen (DE); Stefan Haufe, Goettingen (DE)

(73) Assignee: Volkswagen AG, Wolfsburg (DE)

( * ) Notice: Subject to any disclaimer, the term of this patent is extended or adjusted under 35 U.S.C. 154(b) by 218 days.

(21) Appl. No.: 11/498,730

(22) Filed: Aug. 4, 2006

(65) Prior Publication Data

US 2007/0003808 A1    Jan. 4, 2007

Related U.S. Application Data

(63) Continuation of application No. PCT/EP2005/000838, filed on Jan. 28, 2005.

(30) Foreign Application Priority Data

Feb. 4, 2004    (DE) .................. 10 2004 005 389

(51) Int. Cl.
*H01M 8/10* (2006.01)
*C08J 5/20* (2006.01)

(52) U.S. Cl. .......................... 429/33; 521/27
(58) Field of Classification Search .............. None
See application file for complete search history.

(56) References Cited

U.S. PATENT DOCUMENTS 6,099,988 A    8/2000  Savinell et al.
7,238,451 B2 *  7/2007  Frech et al. .................. 429/314
2005/0118476 A1 *  6/2005  Melzner et al. ............... 429/33
2005/0272859 A1 * 12/2005  Klaehn et al. ............... 524/565

FOREIGN PATENT DOCUMENTS

| EP | 1 378 952 A1 | | 1/2004 |
| WO | WO00/44816 | * | 3/2000 |
| WO | WO2003/043116 | * | 5/2003 |

OTHER PUBLICATIONS

Staiti et al. Sulfonated polybenzimidazole membranes-preparation and physico-chemical characterization, Jun. 2001, Elsevier, Journal of Memrane science, vol. 188 (2001) pp. 71-78.*

* cited by examiner

*Primary Examiner*—Dah-Wei D Yuan
*Assistant Examiner*—Maria J Laios
(74) *Attorney, Agent, or Firm*—Sughrue Mion, PLLC

(57) ABSTRACT

A membrane for fuel cells, which is characterized by a homogeneous absorption and good retention of doping agents, and which guarantees a high mechanical stability at high temperatures when doped. Such membranes consist of at least one polymer, whose nitrogen atoms are chemically bonded to a central atom of a derivative of a polybasic inorganic oxo acid. The membranes are produced from polymer solutions that are devoid of water and oxo acid derivatives, by heating the solution that has been introduced into a membrane mold until a self-supporting membrane has been formed and then by thermally regulating the latter. Inventive fuel cells having a membrane electrode assembly (MEA) that comprises a membrane of the invention and phosphoric acid as the doping agent have, for example, an impedance of 0.5-1 $\Omega cm^2$ at a measuring frequency of 1000 Hz and at an operating temperature of 160° C. and a gas flow for hydrogen of 170 mL/min and for air of 570 mL/min. They can be used as high-temperature polyelectrolyte membrane fuel cells for a working temperature of up to at least 250° C.

25 Claims, 4 Drawing Sheets

MEMBRANES FOR FUEL CELLS, METHOD FOR PRODUCING SAID MEMBRANES AND PRODUCTION OF FUEL CELLS USING MEMBRANES OF THIS TYPE

This is a Continuation of International Application PCT/EP2005/000838, with an international filing date of Jan. 28, 2005, which was published under PCT Article 21(2) in German, and the disclosure of which is incorporated into this application by reference.

The invention relates to membranes of organic polymers and derivatives of polybasic inorganic oxo acids, a process for producing the membranes and high-temperature polymer electrolyte membrane fuel cells using such membranes.

U.S. Pat. No. 6,099,988 describes a membrane of PBI doped with phosphoric acid for use in direct methanol fuel cells. It is characterized by an improved conductivity and stability. One disadvantage is that the output of dopants in fuel cell operation at low temperatures is not prevented and the membrane is produced from solutions of the polymer in phosphoric acid and trifluoroacetic acid, which are difficult to control in a production process because of their toxicity, corrosiveness and high vapor pressure.

U.S. Pat. No. 5,525,436, WO 01/18894 A2 and DE 101 55 543 C2 describe high-temperature polymer electrolyte membrane fuel cells containing polymer electrolyte membranes (PEM) based on polybenzimidazole (PBI). These membranes are doped with phosphoric acid. Since the conductivity of these polymer electrolyte membranes (PEM) is not necessarily dependent on the presence of water in the system, these PEM fuel cells can be operated at temperatures between 100° C. and 200° C. The disadvantage of these fuel cells is the discharge of phosphoric acid due to washing out with product water, in particular at temperatures below 100° C. This temperature range is particularly relevant in mobile applications, necessarily during the warm up and cool down of such fuel cells, resulting in a power loss in the systems. The thermal stability of PBI is further increased by a low degree of doping with phosphoric acid. However, the mechanical stability of the PBI membranes declines at high degrees of doping. PBI membranes are usually crosslinked chemically to increase their mechanical stability (WO 00/44816 A1, DE 101 10 752 A1, DE 101 40 147 A1). Compounds with isocyanate groups and epoxy groups capable of reacting with the NH groups of the polybenzimidazole are used as the crosslinking agents. The crosslinking agent may be added to the polymer solution and reacted by raising the temperature during the membrane formation step while the solvent evaporates at the same time. Criteria for compounds suitable for use as crosslinking agents include a good solubility in the polymer solution, a high crosslinking rate and chemical and thermal stability of the crosslinking sites under operating conditions in the fuel cell. The swelling capacity of the membrane with $H_3PO_4$ dopant is influenced by the crosslinking. Specifically, the maximum achievable degree of doping drops. The swelling pressure that results on uptake of dopant may lead to destruction of the membrane at high degrees of doping. Polybenzimidazole may be used by reacting it with diepoxides and/or diisocyanates in this way, although this has disadvantages with regard to doping of the membrane with dopant.

It is also a disadvantage that the thermal and chemical stability of membranes crosslinked with diisocyanates in particular is inadequate for fuel cell applications. A disadvantage of crosslinking with diepoxide compounds is that the crosslinking proceeds relatively slowly at temperatures below 100° C., which leads to technical problems in the synthesis process. To achieve a high degree of crosslinking, the reaction zone must be long and/or the casting rate in continuous production of membranes on a membrane-casting machine must be greatly reduced. At temperatures above 100° C., the solvent evaporates more rapidly than the crosslinking reaction can take place. The decline in polymer chain mobility associated with this may result in a membrane with a low degree of crosslinking and a low mechanical stability under load and an undesirably high swelling capacity. Another disadvantage is that there cannot be any influence on the binding of phosphoric acid in the membrane due to the crosslinking with diepoxides or diisocyanates. The disadvantage of the phosphoric acid discharge at low operating conditions temperatures is not overcome.

The object of the present invention is therefore to provide membranes for fuel cells characterized by homogeneous uptake and retention of dopants and to ensure a high mechanical stability in the doped state at temperatures up to at least 250° C. In addition, a process for producing such membranes is disclosed. Another object of the present invention is to provide fuel cells using such membranes for mobile and stationary applications.

These objects are achieved through the inventions defined by the claims. The membranes of the invention comprise at least one polymer containing nitrogen atoms, the polymer(s) being chemically bonded to the central atom of a polybasic inorganic oxo acid or a derivative thereof. As shown by IR spectra, the chemical bond may be an amide bond.

Polybasic inorganic oxo acids (Cotton, Wilkinson, *Inorganic Chemistry*, Verlag Chemie, Weinheim, Deerfield Beach, Fla., Basel, 1982, $4^{th}$ edition, pp. 238-239) are acids having the general formula $H_nXO_m$, where $n>1$, $m>2$, $n \geq m$ and X is an inorganic central atom (m and n are integers). The central atom may be phosphorus, sulfur, molybdenum, tungsten, arsenic, antimony, bismuth, selenium, germanium, tin, lead, boron, chromium or silicon. Phosphorus, molybdenum, tungsten and silicon are preferred, and phosphorus is especially preferred.

The polymer and the central atom of the oxo acid are preferably crosslinked to form a network capable of uptaking dopants such as phosphoric acid, forming proton-conducting polyelectrolyte membranes (PEM). The network is designed to be at least two-dimensional, preferably three-dimensional, and preferably with a low number of oxo acid units with respect to the polymer.

Membranes that are especially suitable for use in fuel cells have a degree of crosslinking of at least 70% of the polymer, preferably at least 80%, and more preferably at least 90%.

The membranes of the invention may be produced, for example, by reacting polybenzimidazole with alkoxy compounds and/or esters, amides or acid chlorides of an oxo acid.

The membranes of the invention do not have proton-conducting properties suitable for fuel cells. However, surprisingly, the membranes of the present invention are excellent for uptake and fixation of dopants such as phosphoric acid. Fixation of dopant in the membranes of the present invention remains strong, even at temperatures below 100° C., such that dopant is not discharged even in the startup and slow-down ranges of fuel cell operation. In addition, the membrane of the present invention has greater hydrophobicity than conventional polybenzimidazole membranes, and thus the membranes of the present invention do not absorb the product water of the fuel cell, thereby preventing or greatly reducing discharge of phosphoric acid.

The preferred polymers for use with the present invention are selected from the group consisting of polybenzimidazole, polypyrridine, polypyrimidine, polyimidazoles, polybenzthiazoles, polybenzoxazoles, polyoxadiazoles, polyquinoxalines, polythiadiazoles, poly(tetraazapyrenes) and a combination of two or more thereof. Other suitable polymers include polymers having reactive groups in the side chain that are capable of forming amide bonds, and polymers with primary or secondary amino groups, as well as mixtures of these polymers with others. According to the present invention, organic derivatives, e.g., in the form of alkoxy compounds, esters, amides and acid chlorides, are preferred as oxo acid derivatives.

The method for producing membranes according to the present invention comprises the following steps:
a) preparing an anhydrous homogeneous solution of at least one organic polymer and a derivative of a polybasic inorganic oxo acid, whereby the at least one polymer has reactive groups capable of forming chemical bonds with the central atom of the oxo acid,
b) casting the resulting solution in a membrane mold,
c) heating the solution cast in the membrane mold to a temperature in the range of 50° C. to 90° C. to form a self-supporting membrane,
d) thermally regulating the membrane at a temperature in the range of 150° C. to 400° C. for a period of one minute to five hours, and removing the residual solvent.

To form a self-supporting membrane, it is essential for the reaction of the polymers with the oxo acid derivatives to proceed rapidly enough upon heating of the solution cast in the membrane mold to a temperature in the range of 50° C. to 90° C., and preferably at 70° C. Then the membrane may be removed from the casting substrate without any mechanical damage, and then rolled up, for example, in the case of flat membranes. For thermal regulation, partial pieces may be removed from the roll with a time lag. In a preferred embodiment, thermal regulation is performed in a continuous process. Continuous thermal regulation has the advantage that the membranes of the invention may be easily produced on a production scale using a conventional membrane casting machine. In preferred embodiments, the thermal regulation is performed at temperatures in the range of 200° C. to 300° C., and more preferably in the range of 230° C. to 280° C. and over a period in the range of one minute to one hour. However, it is also possible to extend the thermal regulation process for up to five hours. To produce a homogeneous solution and to prevent side reactions, the production process is performed under anhydrous conditions, working in anhydrous solvents, with dry reagents and under a dry protective gas atmosphere in a manner with which those skilled in the art are familiar.

To produce a homogeneous batch solution, the phosphate ester is used in the form of a salt, preferably a weak organic base, and more preferably a weak and highly volatile organic base, e.g., an amine.

Organic oxo acid derivatives with phosphorus, sulfur, molybdenum, tungsten or silicon as the central atom of the oxo acid are preferably used in the process of the present invention. The organic oxo acid derivatives used include, for example, acid chlorides, alkoxy compounds, preferably esters and amides of neutralized polybasic inorganic acids. In especially preferred embodiments of the invention, 2-(diethylhexyl) phosphate, molybdenyl acetylacetonate and/or tetraethoxysilane is/are used as organic derivatives in the process. The polymers used in the process of the present invention are selected from the group consisting of polybenzimidazole, polypyrridine, polypyrimidine, polyimidazoles, polybenzthiazoles, polybenzoxazoles, polyoxadiazoles, polyquinoxalines, polythiadiazoles, poly(tetraazapyrenes) and a combination of two or more thereof. Other suitable polymers include polymers having reactive groups capable of forming amide bonds in the side chain and polymers having primary or secondary amino groups.

For casting the solution to form a membrane, the solution contains the polymer(s) and the oxo acid derivative in addition to the solvent. Solvents for the solution used to produce the membrane include essentially all solvents in which the polymer(s) and the oxo acid derivative will dissolve. The solvent is preferably selected from the group consisting of N-methylpyrrolidone (NMP), dimethylformamide (DMF), dimethyl sulfoxide (DMSO), dimethylacetamide (DMAc) and mixtures thereof. Dimethylacetamide is especially preferred. The concentration of polymer(s) in the solution is in the range of 4 wt % to 30 wt %, preferably 10 wt % to 25 wt % and more preferably 15 wt % to 25 wt %, based on the weight of the total solution used to produce the membrane. The concentration here depends on the type of polymer(s) and its/their molecular weight and solubility in the respective solvent and/or solvent mixture. The amount of oxo acid derivative is in the range of 5 wt % to 80 wt %, based on the polymer content, preferably 10 wt % to 40 wt %, and more preferably 15 wt % to 30 wt %.

In a preferred embodiment of the method of the invention, PBI is reacted with 2-(diethylhexyl)phosphate, preferably using a 1 wt % solution of PBI in N,N-dimethylacetamide having an intrinsic viscosity of 0.90 dL/g or more. Based on these values, a number-average molecular weight of 60,000 g/mol or higher can be calculated using the Mark-Houwink equation. However, one may also use PBI with a molecular weight in the range of 35,000 g/mol and 200,000 g/mol.

In the present method for producing membranes a chemically stable phosphoric acid amide bond is formed between the PBI and the phosphoric acid derivative. This direct bonding of the phosphoryl group to the nitrogen atom of the polybenzimidazole produces an extremely stable compound. In addition, the phosphoric acid amide is reacted further to phosphoric acid diamide, presumably during thermal regulation, so that the membrane is additionally crosslinked to form a network, thereby further improving its mechanical properties.

Fuel cells of the present invention comprise at least one membrane electrode assembly (MEA) that is/are assembled from two flat gas diffusion electrodes with a membrane of the invention sandwiched between them, as well as a dopant for the membrane. The fuel cells of the invention are high-temperature polyelectrolyte membrane fuel cells suitable for an operating temperature up to at least 250° C. The gas diffusion electrodes are loaded with dopant and act as a dopant reservoir for the membrane, whereby the membrane becomes proton conducting due to the uptake of dopant under the influence of pressure and temperature, and the membrane is connected to the gas distribution electrodes in a proton-conducting manner. Alternatively, it is also possible to impregnate the membranes of the invention directly with the dopant before assembling them to form the MEA. Phosphoric acid is the preferred dopant. The fuel cell may be operated at temperatures between room temperature and at least 250° C. in hydrogen/air operation.

The present invention will now be described in greater detail on the basis of FIG. 1 through FIG. 4 and the exemplary embodiments.

EXAMPLE 1

Producing a Membrane From PBI and 2-(diethylhexyl)phosphate

Under a dry protective gas, 300 g of an anhydrous solution of PBI with an intrinsic viscosity of 0.90 dL/g in dimethylacetamide, and with a polymer concentration of 23 wt %, was mixed with 6.9 g anhydrous 2-(diethylhexyl)phosphate (Sigma Aldrich) while stirring. The viscosity was determined with the help of a 1 wt % solution of PBI in N,N-dimethylacetamide. Using the Mark Houwink equation, an average molecular weight of 60,000 g/mol can be calculated for the PBI from the intrinsic viscosity. The 2-(diethylhexyl) phosphate had first been neutralized with triethanolamine and adjusted to a pH of 7. The resulting solution was cast on a flat substrate under a protective gas to yield a flat membrane. The solution cast in a membrane mold was heated at a temperature of 70° C. until a self-supporting membrane had formed. Then the membrane was thermally regulated for a period of four hours at a temperature of 250° C., removing the residual solvent.

The membrane produced in this manner had a thickness of approximately 45 µm and could be used directly for fabrication of membrane electrode assemblies.

Figure 1:
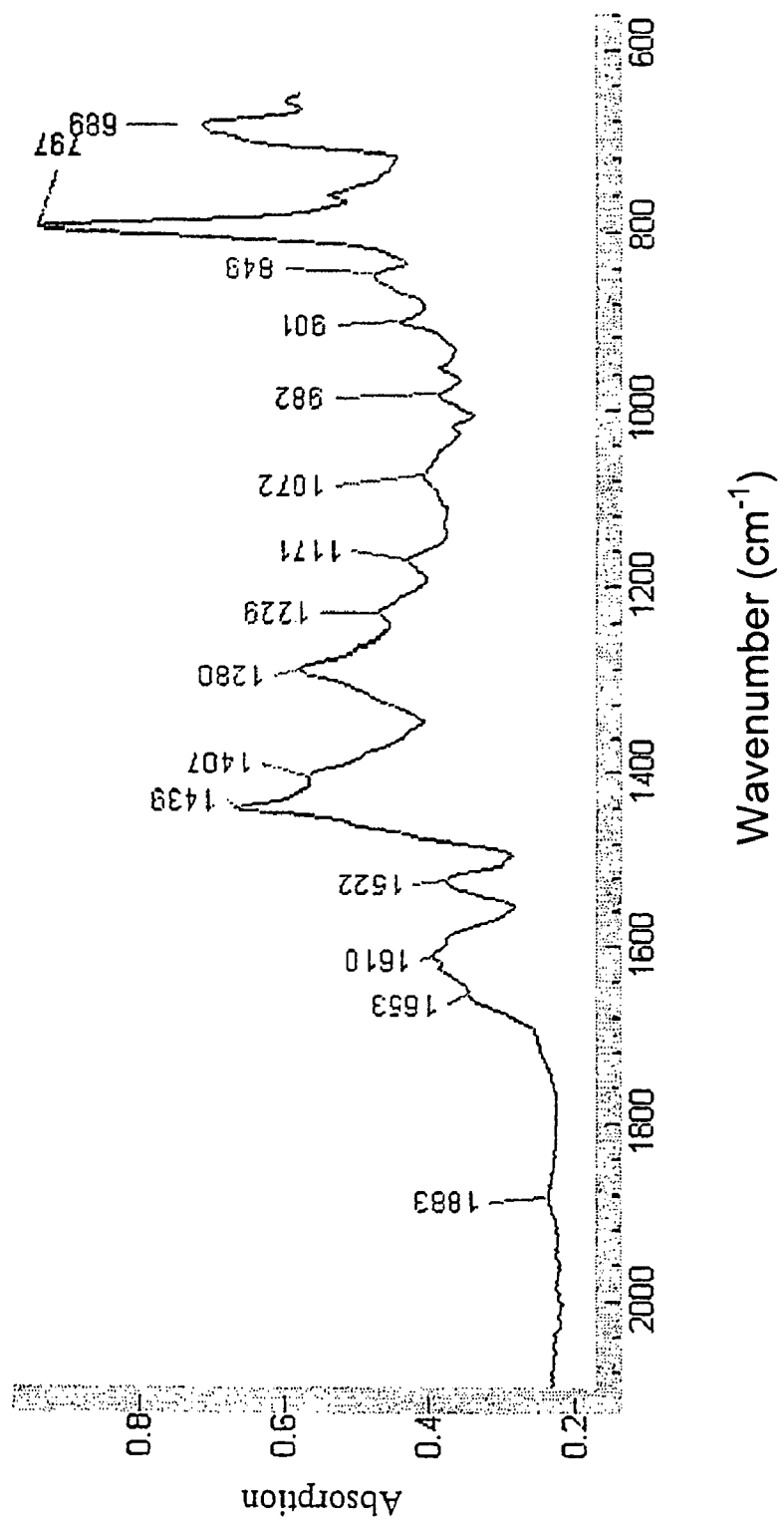
FIG. 1 shows an IR spectrum of the membrane of the invention.

It is known that a sharp peak is observed at a wavelength of 1000 $cm^{-1}$ in an IR spectrum for a phosphate ester. Such a signal can be seen, for example, with a membrane produced according to Example 1 of DE 101 55 543 C2. As shown in FIG. 1, however, the IR spectrum of the membrane produced according to Example 1 does not have such a peak, which must be attributed to the fact that the phosphate ester has completely reacted with PBI. Instead, there is a peak at a wavelength of approximately 800 $cm^{-1}$, which can be assigned to a phosphorus-nitrogen bond of a phosphoric acid amide.

EXAMPLE 2

Tensile Stress Measurements

Tensile stress measurements were performed to evaluate the mechanical stability of the membrane. A membrane sample 10 cm long and 2 cm wide was clamped in a Z 2.5 measurement apparatus from the company Zwick GmbH & Co. and pulled apart at a rate of 5 cm/min. The polymer membrane produced according to Example 1 tears at a stress of 164 $N/mm^2$ and an elongation of 5%.

EXAMPLE 3

Determining the Degree of Crosslinking

The degree of crosslinking was determined by extraction on membranes produced according to Example 1. A sample of a polymer membrane piece with an edge length of 7.5 cm×7.5 cm and with a known starting weight was punched out and placed in a round-bottom flask. Enough dimethylacetamide was added to the round-bottom flask until the piece of polymer was entirely covered with liquid. The round-bottom flask was heated to 130° C. in an oil bath. Uncrosslinked PBI membranes would dissolve completely under these conditions. The solvent was removed by filtration after one hour of heating at 130° C. and then cooling to room temperature. The sample was dried overnight at 200° C. in a drying cabinet. After drying, the sample was placed in a desiccator, which was filled with drying beads and evacuated to 100 mbar for cooling the sample to room temperature. Gravimetrically it was found that 93% of the membrane was insoluble and thus had stable crosslinking.

EXAMPLE 4

Producing a Fuel Cell

To produce a fuel cell, the membrane produced according to Example 1 was cut into square pieces approximately 104.04 $cm^2$ in size. Commercially available ELAT electrodes with a Pt loading of 2.0 $mg/cm^2$ and an area of 50 $cm^2$ from the company E-TEK were loaded with 15 $mg/cm^2$ phosphoric acid. The electrodes impregnated in this manner were installed with the membrane as the membrane electrode assembly (MEA) in a test fuel cell of the company Fuel Cell Technologies, Inc. The test fuel cell was sealed with a contact pressure of 15 bar and conditioned for 16 hours in a stream of nitrogen at 160° C. in the absence of pressure.

EXAMPLE 5

Determining the Power Parameters of the Fuel Cell According to Example 4

Figure 2:
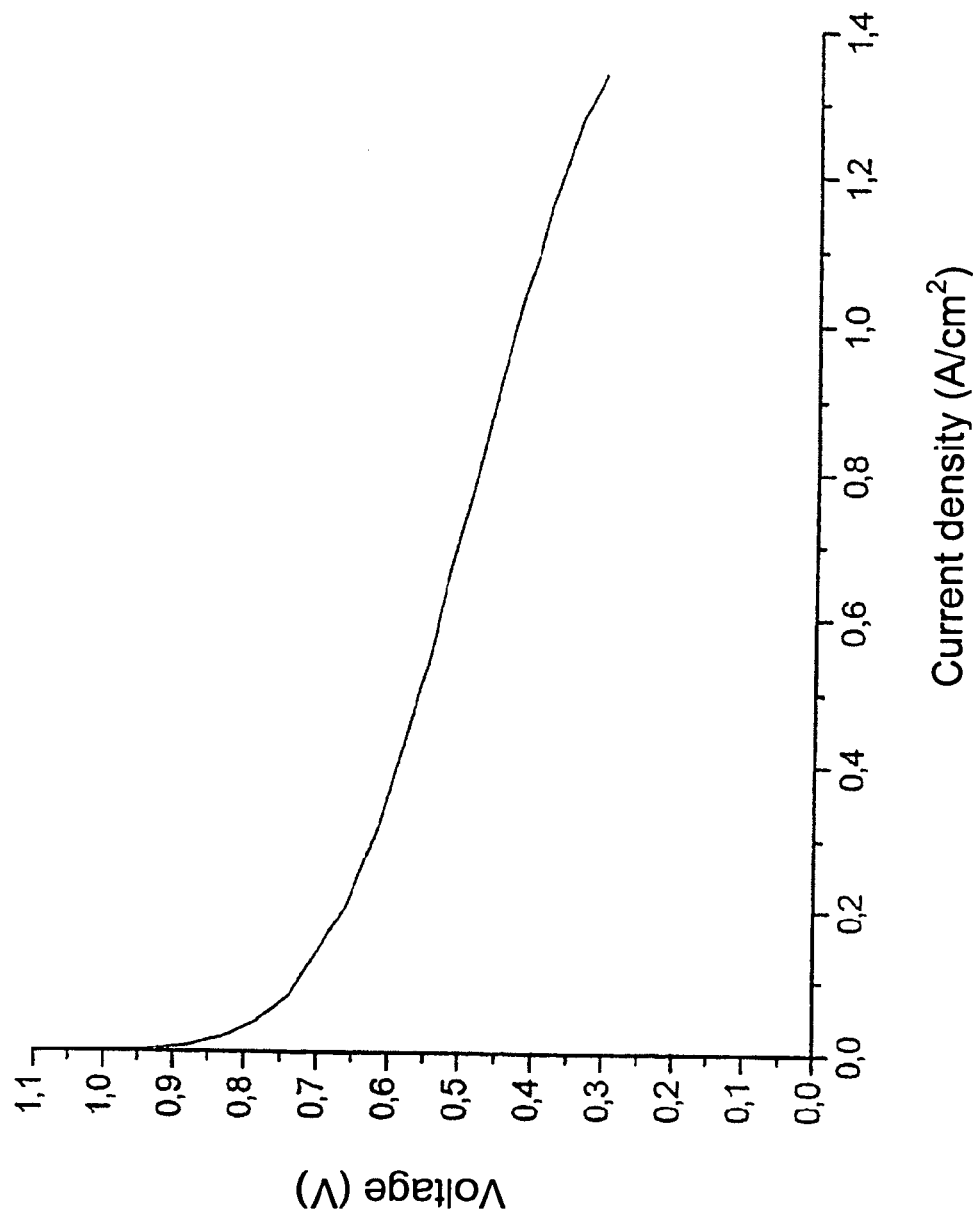
FIG. 2 shows a current-voltage characteristic of a fuel cell of the invention with membranes produced according to Example 1.

FIG. 2 shows a voltage-current density curve for a fuel cell produced according to Example 4 with an MEA at 160° C. The $H_2$ flow rate was 783 smL/min and the air flow rate was 2486 smL/min. The power parameters were determined on an FCATS Advanced Screener from the company Hydrogenics, Inc. At 3 bar abs. a maximum power density of 0.44 $W/cm^2$ and a current density of 1.3 $A/cm^2$ were measured. Dry gases were used here. Under these test conditions, the fuel cell had an impedance of 450 $m\Omega cm^2$ at a measurement frequency of 1689 Hz.

EXAMPLE 6

Producing a Membrane of PBI and 2-molybdenyl acetylacetonate

Under a dry protective gas, 300 g of a solution of PBI with an intrinsic viscosity of 0.90 dL/g in dimethylacetamide, and a polymer concentration of 23 wt %, was mixed with 6.9 g anhydrous 2-molybdenyl acetylacetonate (Sigma Aldrich) while stirring. The viscosity was determined with the help of a 1 wt % solution of PBI in N,N-dimethylacetamide. Using the Mark Houwink equation, an average molecular weight of 60,000 g/mol can be calculated for the PBI from the intrinsic viscosity. The resulting solution was cast to form a flat membrane on a substrate under a protective gas. The solution cast in a membrane mold was heated to a temperature of 70° C. to form a self-supporting membrane. Then the membrane was thermally regulated for four hours at a temperature of 250° C., removing the residual solvent. The membrane had a thickness of approximately 44 µm and could be used directly after production to fabricate membrane electrode assemblies.

EXAMPLE 7

Tensile Stress Measurements

To evaluate the mechanical stability of the membrane produced according to Example 6, tensile stress measurements were performed as described in Example 2. The membrane produced according to Example 6 tears at a stress of 199 N/mm$^2$ and an elongation of 5%.

EXAMPLE 8

Determining the Degree of Crosslinking

The degree of crosslinking was determined on the membranes produced according to Example 6 by extraction as described in Example 3.

Gravimetrically it was found that 98% of the membrane was insoluble and thus had stable crosslinking.

EXAMPLE 9

Producing a Fuel Cell

For the production for a fuel cell, a membrane produced according to Example 6 was cut into square pieces approximately 104.04 cm$^2$ in size. Commercially available ELAT electrodes with a 2.0 mg/cm$^2$ Pt loading and an area of 50 cm$^2$ from the company E-TEK were loaded with 17 mg/cm$^2$ phosphoric acid and installed as a membrane electrode assembly (MEA) in a conventional arrangement in the test fuel cell from the company Fuel Cell Technologies, Inc. This cell was sealed with a contact pressure of 15 bar and conditioned in a stream of nitrogen at 160° C. in the absence of pressure.

EXAMPLE 10

Determining the Power Parameters of the Fuel Cell According to Example 9

Figure 3:
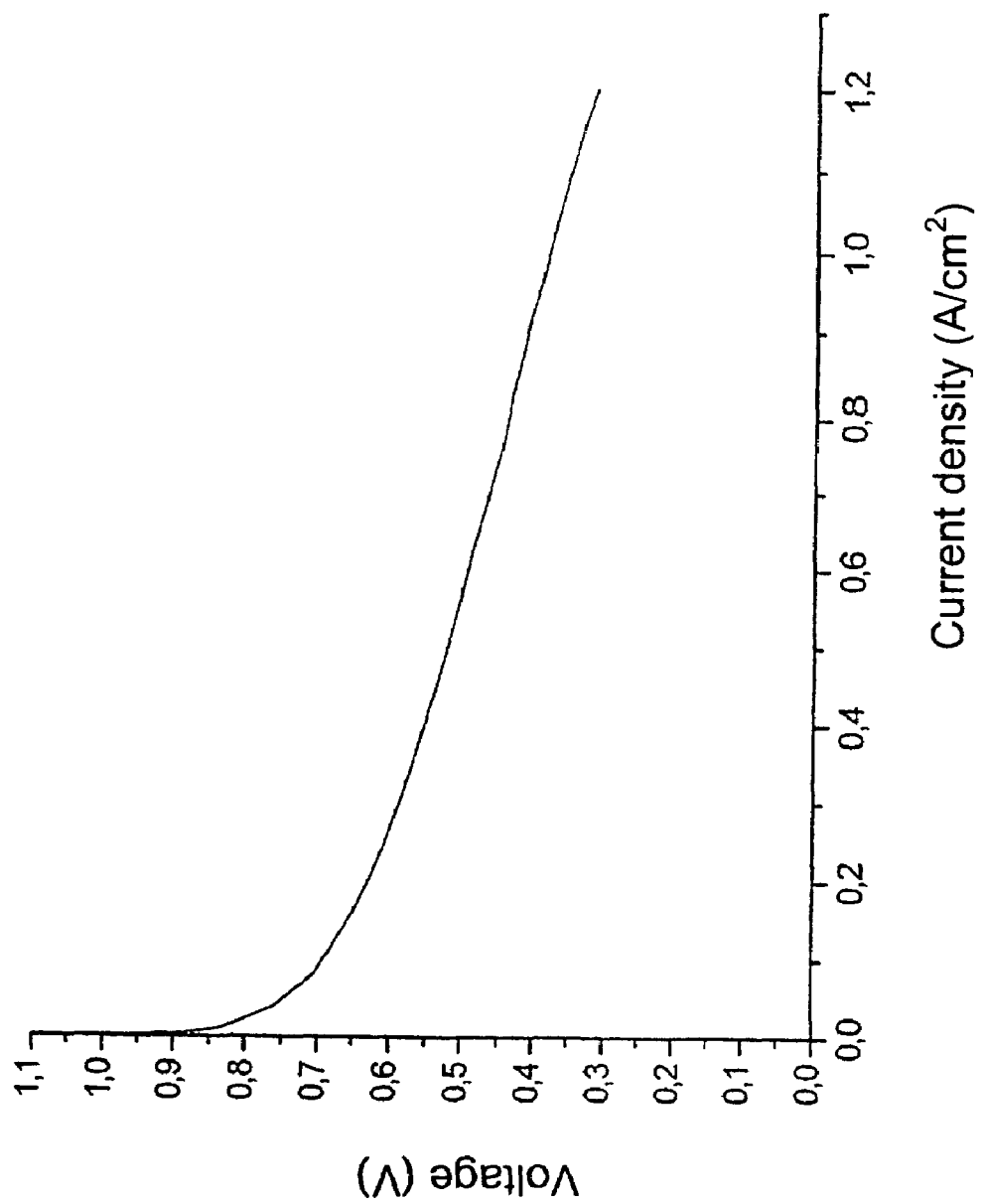
FIG. 3 shows a current-voltage characteristic of a fuel cell of the invention with membranes produced according to Example 6 and FIG. 4 shows a current-voltage characteristic of a fuel cell of the invention with membranes produced according to Example 11.

FIG. 3 shows the current-voltage curve for a fuel cell produced according to Example 9 at 160° C. The H$_2$ flow rate was 783 smL/min and for air was 2486 smL/min. The power parameters were determined on an FCATS Advanced Screener from Hydrogenics, Inc. Using dry gases, a maximum power density of 0.28 W/cm$^2$ and a current density of 1.0 A/cm$^2$ were measured at 3 bar abs. Under the stated test conditions, the MEA had an impedance of 950 mΩcm$^2$ at a measurement frequency of 2664 Hz.

EXAMPLE 11

Producing a Membrane from PBI and tetraethoxysilane

Under a protective gas, 300 g of a solution of PBI with an intrinsic viscosity of 0.90 dL/g in dimethylacetamide and a polymer concentration of 23 wt % was mixed with 2.76 g tetraethoxysilane (silicate TES 28 from Wacker) while stirring. The resulting solution was cast to form a flat membrane on a flat substrate under a protective gas. The solution converted to membrane form was heated to a temperature of 70° C. until a self-supporting membrane had developed. Then the membrane was thermally regulated to remove the residual solvent at a temperature of 250° C. for a period of four hours, and then for 30 minutes at 350° C. The membrane was approximately 36 µm thick and could be used directly after production to fabricate membrane electrode assemblies.

EXAMPLE 12

Tensile Stress Measurements

The mechanical stability of the membrane produced according to Example 11 was analyzed by tensile stress measurements as described in Example 2. The membrane produced according to Example 11 tears at a stress of 175 N/mm$^2$ and an elongation of 5%.

EXAMPLE 13

Determining the Degree of Crosslinking

Of the membranes produced according to Example 11, the degree of crosslinking was determined by extraction as described in Example 3.

Gravimetrically, it was found that 99% of the membrane was insoluble and thus had stable crosslinking.

EXAMPLE 14

Producing a Fuel Cell

For the production of a fuel cell, a membrane produced according to Example 11 was cut into square pieces approximately 56.25 cm$^2$ in size. Commercially available ELAT electrodes with a 2.0 mg/cm$^2$ Pt loading and an area 10 cm$^2$ from the company E-TEK were loaded with 13 mg/cm$^2$ phosphoric acid and installed with the membrane as a membrane electrode assembly (MEA) in a conventional arrangement in the test fuel cell from the company Fuel Cell Technologies, Inc. This cell was sealed with a contact pressure of 15 bar and conditioned in a stream of nitrogen for 16 hours at 160° C. without pressure.

EXAMPLE 15

Determining the Power Parameters of the Fuel Cell According to Example 14

Figure 4:
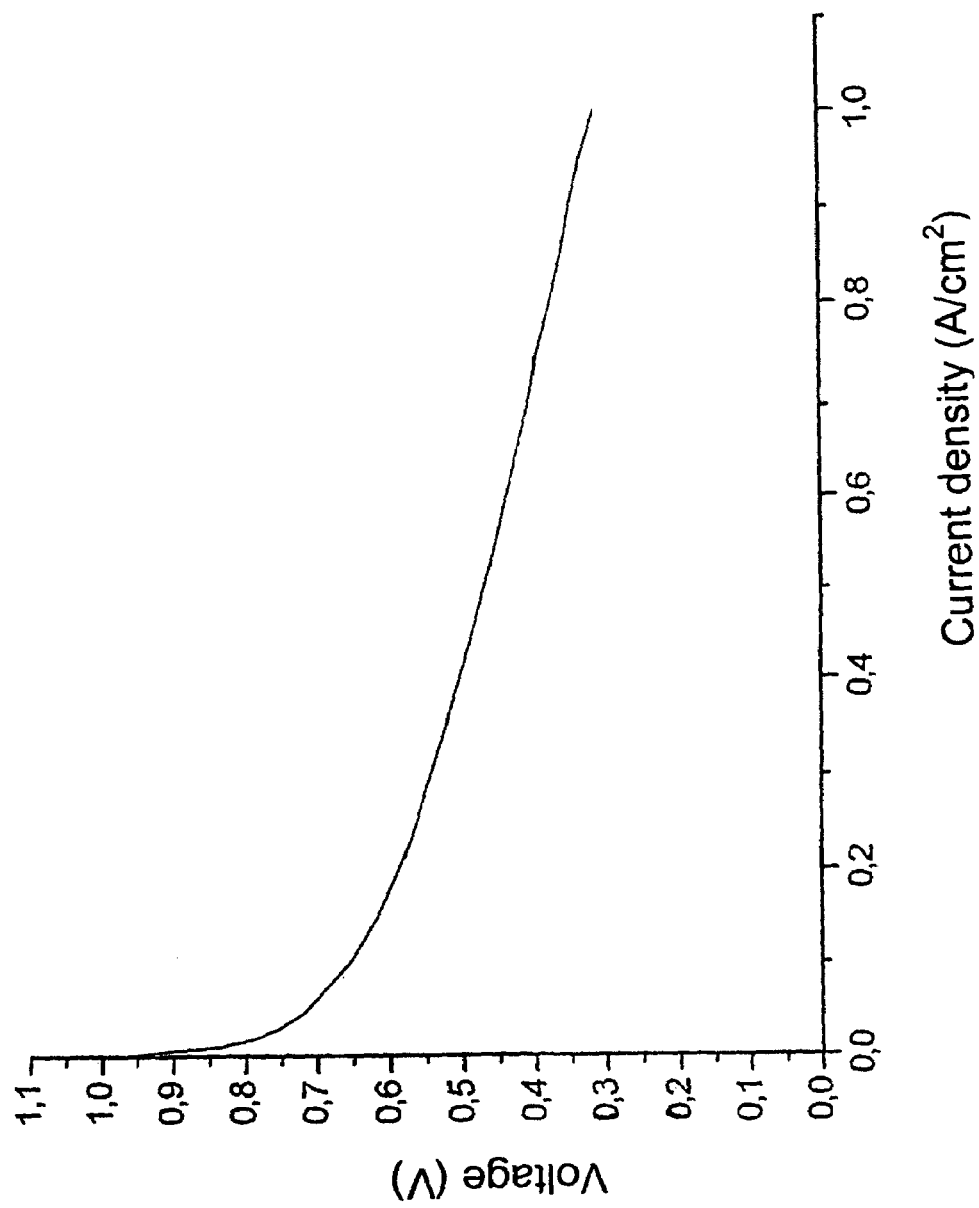

FIG. 4 shows a voltage-current curve for a fuel cell at 180° C. produced according to Example 14. The gas flow for H$_2$ was 170 smL/min and for air was 570 smL/min. Unmoistened gases were used. The power parameters were determined on an FCATS Advanced Screener from the company Hydrogenics, Inc. The maximum power measured at a current density of 1.0 A/cm$^2$ at 3 bar abs. was 0.34 W/cm$^2$. Under the stated test conditions, the MEA had an impedance of 280 mΩcm$^2$ at a measurement frequency of 1314 Hz.

What is claimed is:

1. A membrane for a fuel cell comprising:
   (a) at least one nitrogen-containing polymer and
   (b) an organic derivative of a neutralized polybasic inorganic oxo acid, wherein a nitrogen atom of the at least one nitrogen-containing polymer is chemically bound to a central atom of the organic derivative of a neutralized polybasic inorganic oxo acid.

2. The membrane of claim 1, wherein the nitrogen atom is chemically bonded to the central atom through an amide bond.

3. The membrane of claim 1, wherein the at least one nitrogen-containing polymer and the organic derivative of the neutralized polybasic inorganic oxo acid are crosslinked to form a network capable of uptaking dopants and developing proton-conducting properties.

4. The membrane of claim 3, wherein the network is at least two-dimensional.

5. The membrane of claim 3, wherein the dopant is phosphoric acid.

6. A membrane for a fuel cell comprising
(a) at least one nitrogen-containing polymer and
(b) an organic derivative of a neutralized polybasic inorganic oxo acid, wherein a nitrogen atom of the at least one nitrogen-containing polymer is chemically bound to a central atom of the organic derivative of a neutralized polybasic inorganic oxo acid,
wherein the at least one nitrogen-containing polymer and the organic derivative of a neutralized polybasic inorganic oxo acid are crosslinked to form a network capable of uptaking dopants and developing proton-conducting properties, and
wherein at least 70% of the at least one nitrogen-containing polymer is crosslinked.

7. A membrane for a fuel cell comprising
(a) at least one nitrogen-containing polymer and
(b) an organic derivative of a neutralized polybasic inorganic oxo acid, wherein a nitrogen atom of the at least one nitrogen-containing polymer is chemically bound to a central atom of the organic derivative of a neutralized polybasic inorganic oxo acid,
wherein the one nitrogen-containing polymer and the organic derivative of a neutralized polybasic inorganic oxo acid are crosslinked to form an at least two-dimensional network capable of uptaking dopants and developing proton-conducting properties, and
wherein at least 70% of the at least one nitrogen-containing polymer is crosslinked.

8. The membrane of claim 1, wherein the at least one nitrogen-containing polymer is at least one selected from the group consisting of: polybenzimidazole, polypyrridine, polypyrimidine, polyimidazoles, polybenzthiazoles, polybenzoxazoles, polyoxadiazoles, polyquinoxalines, polythiadiazoles, poly(tetraazapyrenes), or wherein the at least one nitrogen-containing polymer has reactive groups in the side chain capable of forming amide bonds, or has primary and secondary amino groups.

9. The membrane of claim 1, wherein the inorganic central atom is at least one of: phosphorus, sulfur, molybdenum, tungsten, arsenic, antimony, bismuth, selenium, germanium, tin, lead, boron, chromium and silicon.

10. The membrane of claim 9, wherein the organic derivative of a neutralized polybasic inorganic oxo acid, is an alkoxy compound, an ester, an amide or an acid chloride.

11. The membrane of claim 10, wherein the organic derivative of a neutralized polybasic inorganic oxo acid includes one or more of 2-(diethylhexyl) phosphate, molybdenyl acetylacetone and tetraethoxysilane.

12. A method for producing the membrane of claim 1, comprising:
a) producing an anhydrous homogeneous solution of the at least one nitrogen-containing polymer and the organic derivative of a neutralized polybasic inorganic oxo acid having an inorganic central atom, wherein the at least one nitrogen-containing polymer has reactive groups capable of forming chemical bonds with the central atom of the organic derivative of a neutralized polybasic inorganic oxo acid,
b) casting the resulting solution in a membrane mold,
c) heating the solution placed in the membrane mold to a temperature in the range of 50 to 90° C. to form a self-supporting membrane, and
d) thermally regulating the membrane at a temperature in the range of 150 to 400° C. for a period of one minute to five hours, and removing residual solvent.

13. The method of claim 12, wherein the organic derivative of a neutralized polybasic inorganic oxo acid one or more of an alkoxy compound, an ester, an acid chloride, or an amide.

14. The method of claim 13, wherein the central atom is at least one of:
phosphorus, sulfur, molybdenum, tungsten, arsenic, antimony, bismuth, selenium, germanium, tin, lead, boron, chromium and silicon.

15. The method of claim 12, wherein the organic derivative of a neutralized polybasic inorganic oxo acid is at least one of: 2-(diethylhexyl) phosphate, molybdenyl acetylacetonate and tetraethoxysilane.

16. The method of claim 12, wherein the at least one nitrogen-containing polymer is at least one selected from the group consisting of: polybenzimidazole, polypyrridine, polypyrimidine, polyimidazoles, polybenzthiazoles, polybenzoxazoles, polyoxadiazoles, polyquinoxalines, polythiadiazoles, poly(tetraazapyrenes), or wherein the at least one nitrogen-containing polymer has reactive groups in the side chain capable of forming amide bonds, or has primary and secondary amino groups.

17. A fuel cell comprising at least one membrane electrode assembly, the membrane electrode assembly formed from two flat gas distribution electrodes, a membrane according to claim 1, and a dopant for the membrane,
wherein said membrane is sandwiched between the two electrodes.

18. The fuel cell of claim 17, wherein the two gas distribution electrodes are loaded with the dopant so as to act as a dopant reservoir, and
wherein the membrane becomes proton-conducting upon uptake of the dopant and upon the action of pressure and temperature, and is connected in a proton-conducting connection to the gas distribution electrodes.

19. The fuel cell of claim 17, wherein the dopant is phosphoric acid.

20. The fuel cell of claim 18, wherein the dopant is phosphoric acid.

21. The fuel cell of claim 17, wherein the fuel cell is operable at temperatures between room temperature and at least 250° C. in a hydrogen/air operation.

22. The membrane of claim 6, wherein at least 80% of the at least one nitrogen-containing polymer is crosslinked.

23. The membrane of claim 7, wherein at least 80% of the at least one nitrogen-containing polymer is crosslinked.

24. The membrane of claim 6, wherein at least 90% of the at least one nitrogen-containing polymer is crosslinked.

25. The membrane of claim 7, wherein at least 90% of the at least one nitrogen-containing polymer is crosslinked.

* * * * *